(12) United States Patent
Curran et al.

(10) Patent No.: US 7,542,283 B1
(45) Date of Patent: Jun. 2, 2009

(54) INTEGRATED DISPLAY COMPUTER WITH TELEPHONE SWITCH CRADLE PERIPHERAL

(75) Inventors: Michael A. Curran, Westerville, OH (US); Gary A. Peck, Columbus, OH (US)

(73) Assignee: Micro Industries Corporation, Westerville, OH (US)

( * ) Notice: Subject to any disclaimer, the term of this patent is extended or adjusted under 35 U.S.C. 154(b) by 411 days.

(21) Appl. No.: 11/421,627

(22) Filed: Jun. 1, 2006

Related U.S. Application Data

(63) Continuation-in-part of application No. 11/131,052, filed on May 17, 2005, now Pat. No. 7,397,659, which is a continuation-in-part of application No. 10/937,976, filed on Sep. 10, 2004, now Pat. No. 7,072,179.

(51) Int. Cl.
*H05K 5/00* (2006.01)
*H05K 7/00* (2006.01)
(52) U.S. Cl. ............ 361/686; 361/681; 361/683
(58) Field of Classification Search ......... 361/681, 361/683, 686
See application file for complete search history.

(56) References Cited

U.S. PATENT DOCUMENTS

| | | | | |
|---|---|---|---|---|
| 5,971,566 A | * | 10/1999 | Tani et al. | 362/294 |
| D427,231 S | * | 6/2000 | Ono | D18/4.6 |
| 6,507,352 B1 | * | 1/2003 | Cohen et al. | 715/817 |
| 6,744,938 B1 | * | 6/2004 | Rantze et al. | 382/312 |
| D536,726 S | * | 2/2007 | Ono | D18/4.6 |
| 2001/0034664 A1 | | 10/2001 | Brunson | |
| 2006/0038009 A1 | * | 2/2006 | Russell et al. | 235/383 |

* cited by examiner

*Primary Examiner*—Jayprakash N Gandhi
*Assistant Examiner*—Anthony M Haughton
(74) *Attorney, Agent, or Firm*—Standley Law Group LLP

(57) ABSTRACT

A housing unit for attaching a telephone switch cradle peripheral to an integrated display computer, and an integrated display computer with a telephone switch cradle peripheral attached thereto. Telephone switch cradle componentry is enclosed in a peripheral housing unit that is attached to a side of the computer. The housing unit comprises an end cap, shroud, and holster for holding telephone switch cradle componentry. The housing unit accepts a handset. In addition to accessing information using the computer's touch screen, users may use the handset to interact with the computer or with a person who can provide the user with additional information of interest. Additional information requested via the handset may be accessible using the computer's touch screen or the handset. A single network connection at the computer supports data and voice communications so that information from remote sources and software operational at the computer distinguishes voice and data communications.

18 Claims, 17 Drawing Sheets

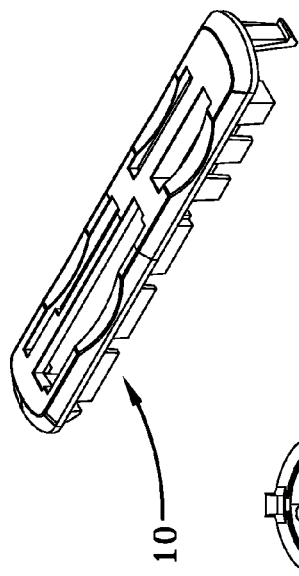
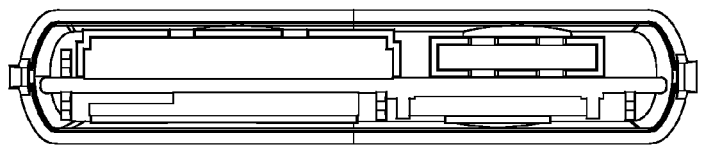
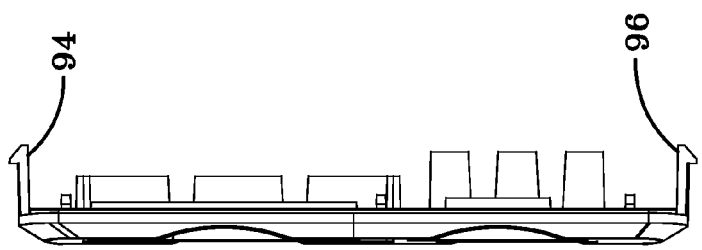
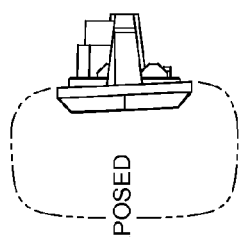
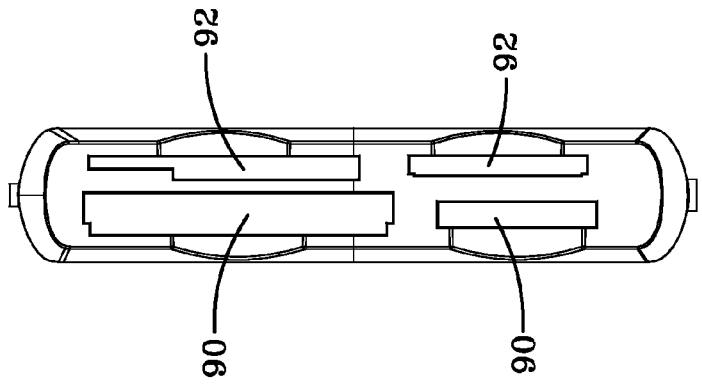

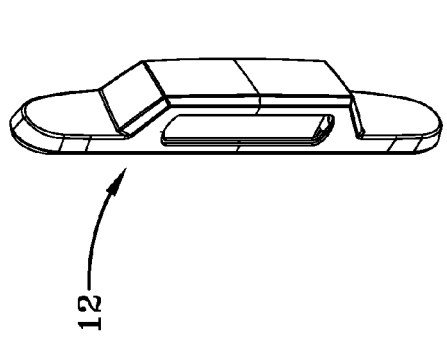
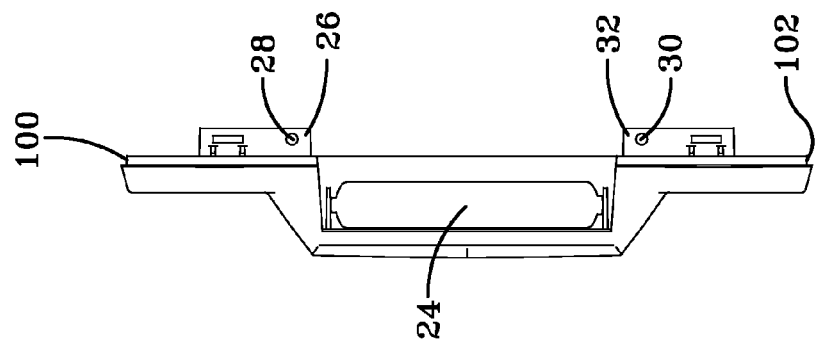
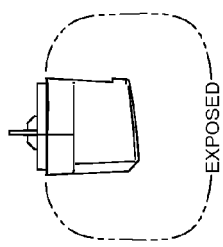
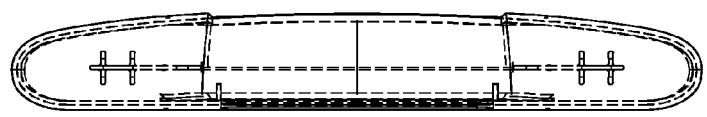
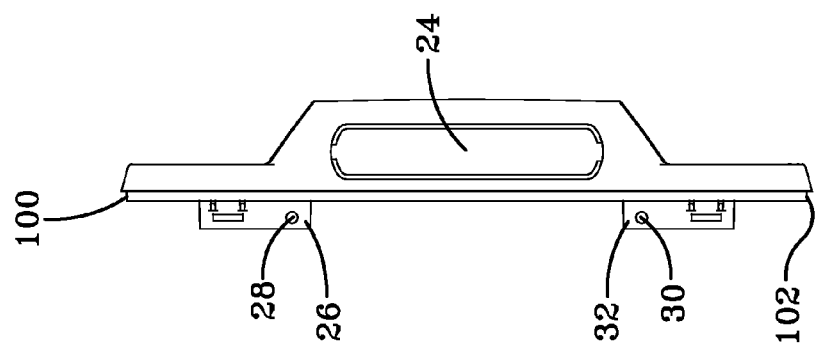

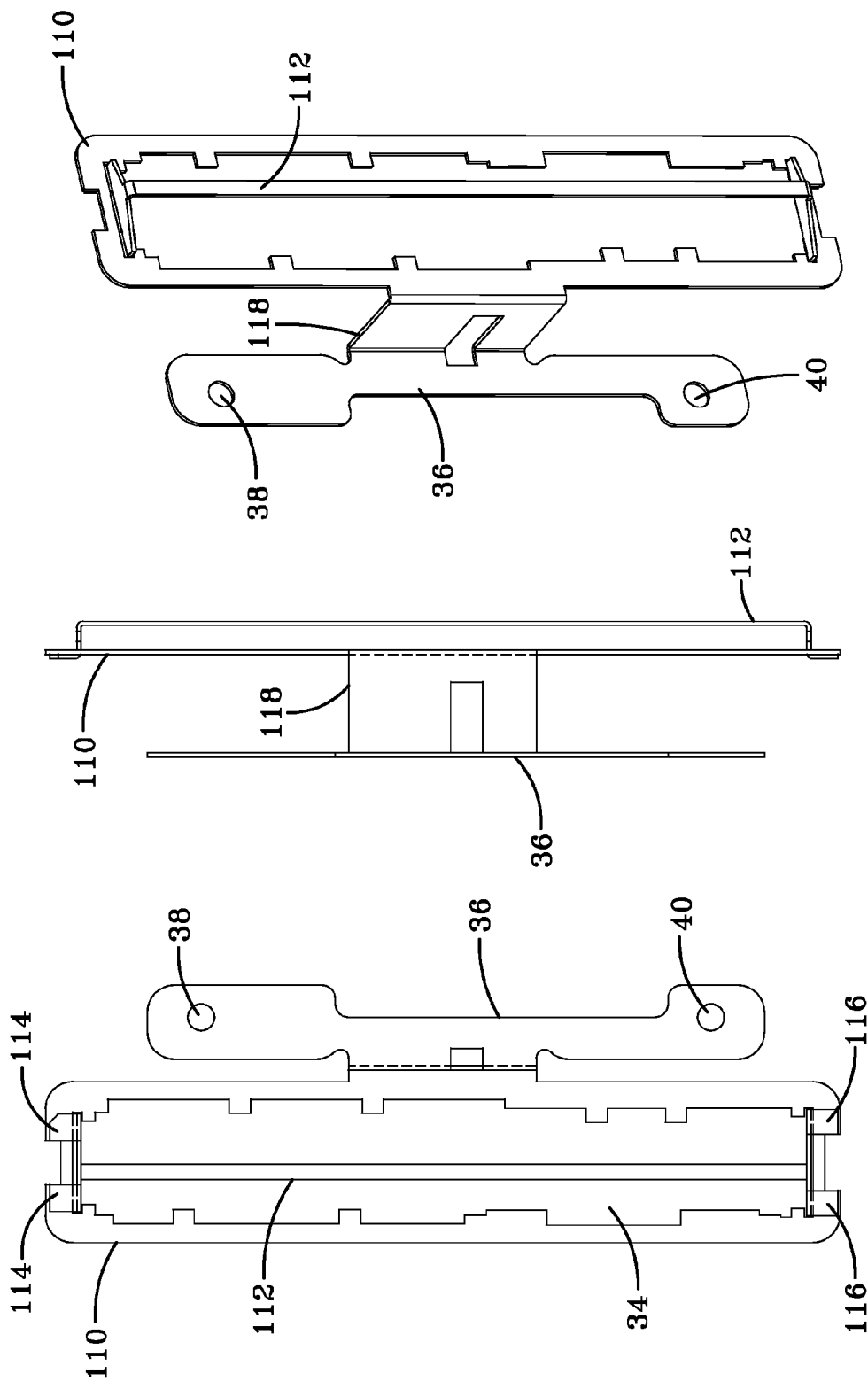

SECTION A-A

SECTION B-B

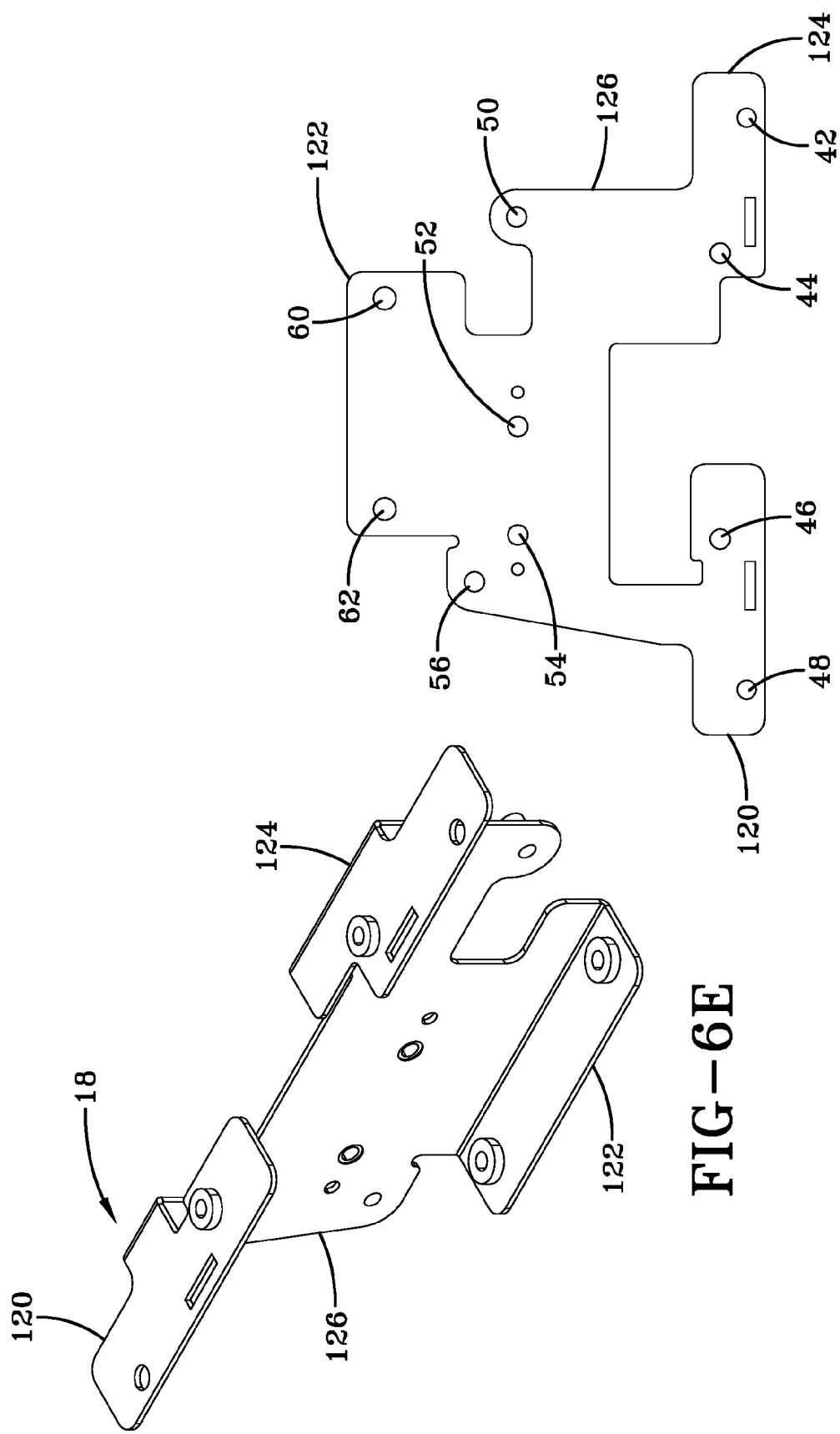

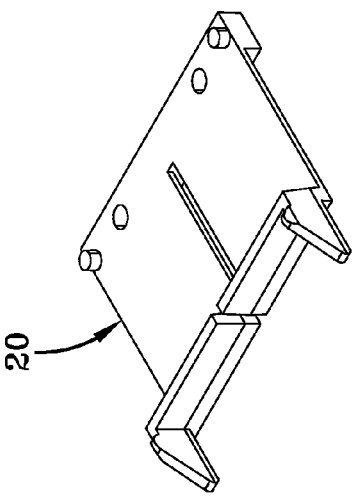
FIG-7E
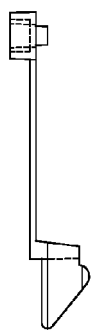
FIG-7D
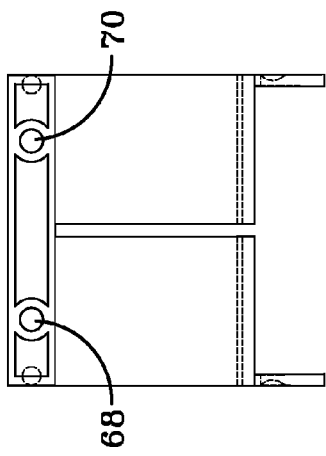
FIG-7A
FIG-7B
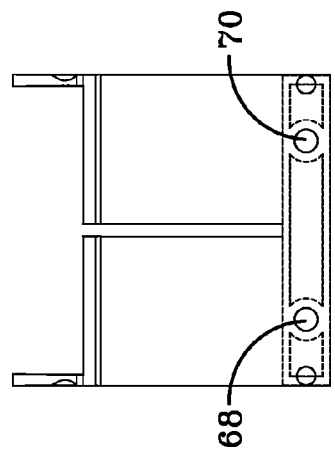
FIG-7C

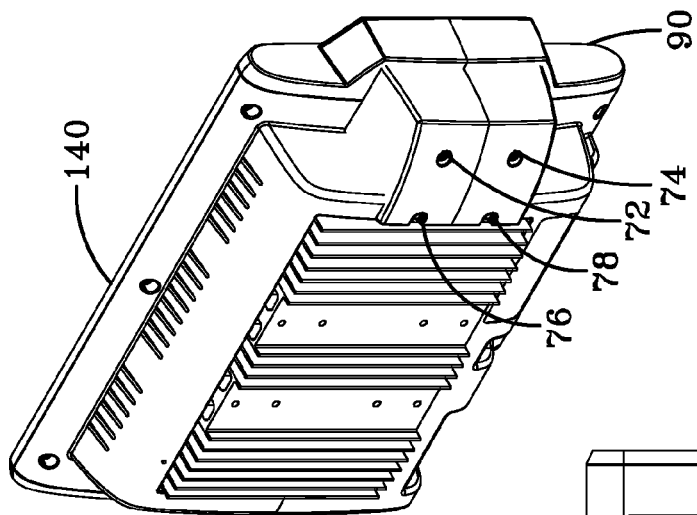
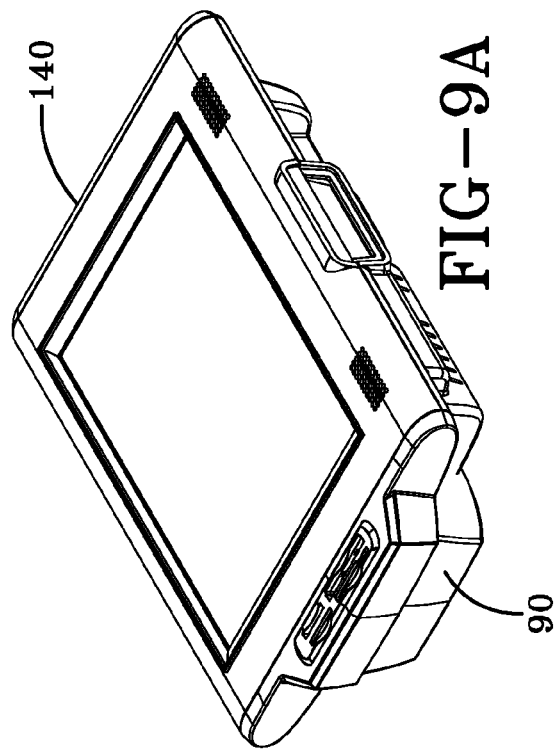
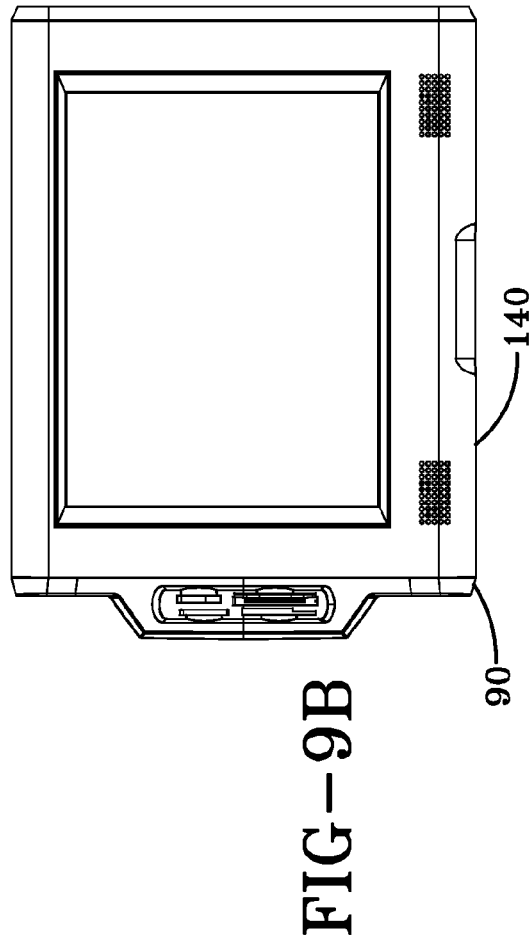
FIG-9C
FIG-9A
FIG-9B

INTEGRATED DISPLAY COMPUTER WITH TELEPHONE SWITCH CRADLE PERIPHERAL

CROSS REFERENCES TO RELATED APPLICATIONS

This application is a continuation-in-part application under 37 CFR 1.53(b) of U.S. patent application Ser. No. 11/131,052, entitled Intecirated Display Computer with Peripherals, filed on May 17, 2005, which is incorporated herein by reference, and a continuation-in-part application under 37 CFR 1.53(b) of U.S. patent application Ser. No. 10/937,976, entitled Fanless Computer With Intecirated Display, filed on Sep. 10, 2004, which is incorporated herein by reference.

FIELD OF THE INVENTION

The present invention relates generally to computers with integrated displays. More specifically, the present invention is directed to a housing unit that can be used to attach peripheral devices (peripherals) to either or both sides of an integrated display computer, and to an integrated display computer with a telephone switch cradle peripheral and a telephone handset. The integrated display computer further supports voice over IP communications.

BACKGROUND OF THE INVENTION

Integrated display computers provide basic computer and monitor functionality in a compact package. Although they provide a great deal of functionality in a single package, the functionality is typically limited to the functionality of a simple desktop or tower computer and display unit. Additional functionality, which is often provided by peripherals that are connected to ports on the computer or display unit, is excluded from the integrated display computer because the additional devices increase the size or space needed for the unit so that it is no longer small and compact.

To accommodate the peripherals that some users may need, most integrated display computer manufacturers simply provide ports at various locations on the computer to provide connections for external devices. In some instances, a cable is used to connect the peripheral to the computer. The ports may be exposed or they may have a hinged cover that opens to accommodate the peripheral. While it is possible to attach and detach different peripherals, the connected peripherals require the availability of additional space around the unit to accommodate both the external device and in some cases, a cable. The resulting package is no longer compact. Furthermore, the result can be unsightly as various devices, and possibly cables, surround the integrated display computer. If the ports have covers, the covers are open and the devices or cables extend from the ports. If the ports do not have covers and devices are not attached to the ports, the ports simply remain exposed. The appearance of the integrated display computer may be altered dramatically as peripherals extend from around the computer. If the computer and devices are used in a commercial setting, the combination of components may appear complex and difficult to operate and therefore, unappealing to users.

In addition to changes in appearance, the use of ports and external devices can provide operational challenges. The ports allow devices to be attached and detached very easily. However, the ability to easily attach peripherals means they are subject to inadvertent detachment. If the integrated display computer is in use in a commercial setting, the peripherals may be subjected to heavy and continuous use increasing the likelihood that a peripheral becomes detached. Some users may simply be tempted to purposefully remove a peripheral. Whether peripheral devices are removed accidentally or purposefully, the expense of operating the computer increases due to increased device maintenance and replacement costs.

There is a need for an integrated display computer with peripherals that provides in a compact package not only basic computer and monitor functionality but additional functionality provided by peripherals. There is also a need for an integrated display computer that provides the additional functionality associated with various peripherals without significantly altering the appearance of the computer. There is a need for an integrated display computer with peripherals that are not easily removed.

Integrated display computers today are often used in commercial settings such as in retail stores. With the multitude of products that retailers make available to consumers, and the wealth of information that exists with respect to such products, retail establishments like to provide consumers with an on-site and efficient means of accessing this additional information regarding the available products. The integrated display computers are typically programmed to provide product information to consumers shopping at the retail establishment. Depending on the particular type of products considered and the level of detail desired, the amount of information that may be provided can be substantial. However, accessing the information often requires the consumer to view and interact with one or more computer screens to make selections that facilitate identification of the product of interest and the particular information regarding the product that the consumer would like to view. In many instances, the on-site computer simply provides the consumer with access to a product web site. As a result, the experience at the retail establishment is no different than the experience the consumer would have by accessing the product web site using his own computer.

Interacting with the computer may be daunting for consumers who are unfamiliar with the technology. Other consumers may simply be uninterested in taking the time that may be required to traverse through various computer screens to locate the specific information of interest. If the on-site computer does nothing more than provide the consumer with access to the product's web site, the store experience is no more engaging than a "shop-at-home" experience. The online experience is completely unrelated to the shopping experience and the consumer must hunt for the information of interest. Therefore, there is a need for an integrated display computer that provides a more effective and efficient means for accessing the wealth of information that exists with respect to the multitude of products that may be available at a single retail establishment. There is a need for an integrated display computer that allows a consumer at a retail establishment to access product information without traversing through endless computer screens to reach the information of interest. Finally, there is a need for an integrated display computer that provides consumers with a unique shopping experience that is directed to their specific needs and requirements.

SUMMARY OF THE INVENTION

The present invention is an integrated display computer with a telephone switch cradle peripheral and telephone handset. The integrated display computer further provides voice over IP (VOIP) functionality. In addition to accessing information using the computer's touch screen, users may use the telephone handset to interact with the computer or with a person who can provide the user with additional information of interest. The additional information requested via the handset may further be accessible using the computer's touch screen or the computer's handset. When using the handset, the additional information may be provided orally via a live person or via a recording. In an example embodiment of the present invention, a single network connection at the integrated display computer supports data and voice communications so that information from remote sources as well as information stored locally may be presented to a user interacting with the computer.

The telephone handset may be attached to the computer using a housing unit that incorporates a telephone switch cradle peripheral into a side of an integrated display computer. The present invention is based on a universal attachment design so that the integrated display computer can accept different types of peripherals, including a telephone switch cradle peripheral for holding a telephone handset. The peripherals are installed in a peripheral housing unit that is attached or affixed to a side of the computer which is designed to accept the housing unit. The housing unit comprises an end cap and a shroud as well as internal components that are assembled to complete the unit. The assembled peripheral housing unit is then attached or affixed to the computer. Peripheral-containing housing units according to the present invention may be attached to either or both sides of the computer. In the event only one peripheral is needed or no peripherals are needed, a "blank" housing unit which does not contain a peripheral device may be attached to the computer. The integrated display computer can accept a housing unit on each side regardless of whether it contains a peripheral.

A peripheral housing unit according to the present invention preferably incorporates all of the components of a peripheral such that only a portion of the peripheral or a peripheral interface with which a user interacts is exposed. In the case of VOIP features and functionality that are provided in an integrated display computer, a handset is made available to a user. The handset rests on a telephone switch cradle peripheral. The telephone switch cradle componentry is hidden within the housing unit. The housing unit is attached to the sides of an integrated display computer such that there are no exposed ports or cables. Therefore, the integrated display computer with peripherals attached according to the present invention has the same streamlined, finished appearance as an integrated display computer that does not accommodate any peripherals.

Various types of peripherals such as a telephone handset and telephone switch cradle as well as media card readers, bar code scanners, magnetic card readers, etc. may be assembled in a housing unit according to the present invention. Because the integrated display computer can accommodate different types of peripherals, as well as "blanks," it can be configured for many different applications. The peripheral housing unit of the present invention gives each integrated display computer a similar, finished appearance regardless of which peripherals are enclosed therein. The use of "blanks" to finish the computer when peripherals are not required furthers the goal of providing a similar, finished appearance for all computers, regardless of their functionality.

In an example embodiment of the present invention, the peripheral housing units are assembled and attached or affixed to an integrated display computer during manufacturing. Once attached to the computer, the peripherals cannot be easily removed, whether accidentally or purposefully. Although the peripheral housing units are attached to the sides of the computer during an assembly process, they appear to be integrated with the display of the computer. The resulting product appears and operates as a single functional unit.

The peripheral housing unit of the present invention may further be used with a fanless integrated display computer. One such fanless integrated display computer that is especially well-suited to use for this purpose is described in U.S. patent application Ser. No. 10/937,976, entitled Fanless Computer With Intecirated Display and filed on Sep. 10, 2004. The fanless integrated display computer described in U.S. patent application Ser. No. 10/937,976 has several passive cooling design features so that it is fanless and therefore, silent. It comprises a unique heat sink that supports the entire enclosure and causes heat in the device to dissipate through vents. The motherboard assembly attaches directly to the heat sink to facilitate thermal transfer characteristics so that components are cooled without the need for a fan. The heat sink further serves as the entire supporting structure of the circuit board assembly and is designed and incorporated into the device so that any stress experienced by the heat sink is not transferred to the solder joints. The entire PCB assembly moves with the heat sink.

The benefits provided by a fanless integrated display computer with peripherals include increased reliability and lower maintenance costs. The device never suffers from unreliability or damage due to fan failure. The natural convection process results in very light air inflow and almost completely eliminates internal dust build-up. There is no build-up of dust that is normally caused by the use of fans and that often leads to fan failures. As a result, maintenance costs associated with protecting components from fan failures, repairing and replacing fans, and repairing and replacing components damaged by fan failures are eliminated. Maintenance costs associated with repair and replacement of peripherals devices are also reduced because the peripherals are secured within and protected by the housing unit.

A fanless integrated display computer with peripherals is silent and therefore, suitable for many applications including use in hospitals, libraries, or any other location where the presence of noise and dust is a concern. It comprises an integrated display with peripherals attached to the sides of the display so it is very compact and suitable for use in locations where the availability of space is a concern.

In one application of the present invention, a fanless integrated display computer is equipped with a telephone handset/telephone switch cradle and contained in a kiosk. The kiosk may be placed for use in a retail establishment, a mall, an amusement park, or any other location where consumers who are shopping for products or services would like to obtain more information on the available products and services. The kiosk is designed so that only the portions of the system with which the consumer interacts, the computer touch screen and telephone handset, are accessible. Power cords, cables, and other componentry that provide the full features and functionality of the system are contained behind a shroud. A tilt feature allows the computer to be viewed and accessed from various angles. The unit may be configured for ADA-compliance by mounting it at a height that conforms to American with Disabilities Act guidelines. The resulting unit is readily accessible and is streamlined and attractive. The ability to interact with the computer using the touch screen as well as the telephone handset makes the kiosk appealing to consumers with varying degrees of technical skill and interest.

BRIEF DESCRIPTION OF THE DRAWINGS

FIG. 2A is a front view, FIG. 2B is a top view, FIG. 2C is a side view, FIG. 2D is a rear view, and FIG. 2E is a perspective view of an insert faceplate shown in FIG. 1;

FIG. 3A is a front view, FIG. 3B is a side view, FIG. 3C is a rear view, FIG. 3D is a top view, and FIG. 3E is a perspective view of an end cap shown in FIG. 1;

FIG. 4A is a rear view, FIG. 4B is a side view, and FIG. 4C is a perspective view of a static discharge plate assembly shown in FIG. 1;

FIG. 6E is a perspective view, and FIG. 6F is a plan view prior to the forming of an assembly bracket shown in FIG. 1;

FIG. 7A is a right side, FIG. 7B is a front view, FIG. 7C is a left side, FIG. 7D is a bottom view, and FIG. 7E is a perspective view of a pin protector shown in FIG. 1;

FIG. 9A is a first perspective view, FIG. 9B is a second perspective view, and FIG. 9C is a front view of an integrated display computer with peripherals of the present invention assembled from the components shown in FIGS. 1-9;

DESCRIPTION OF EXAMPLE EMBODIMENTS

Figure 1:
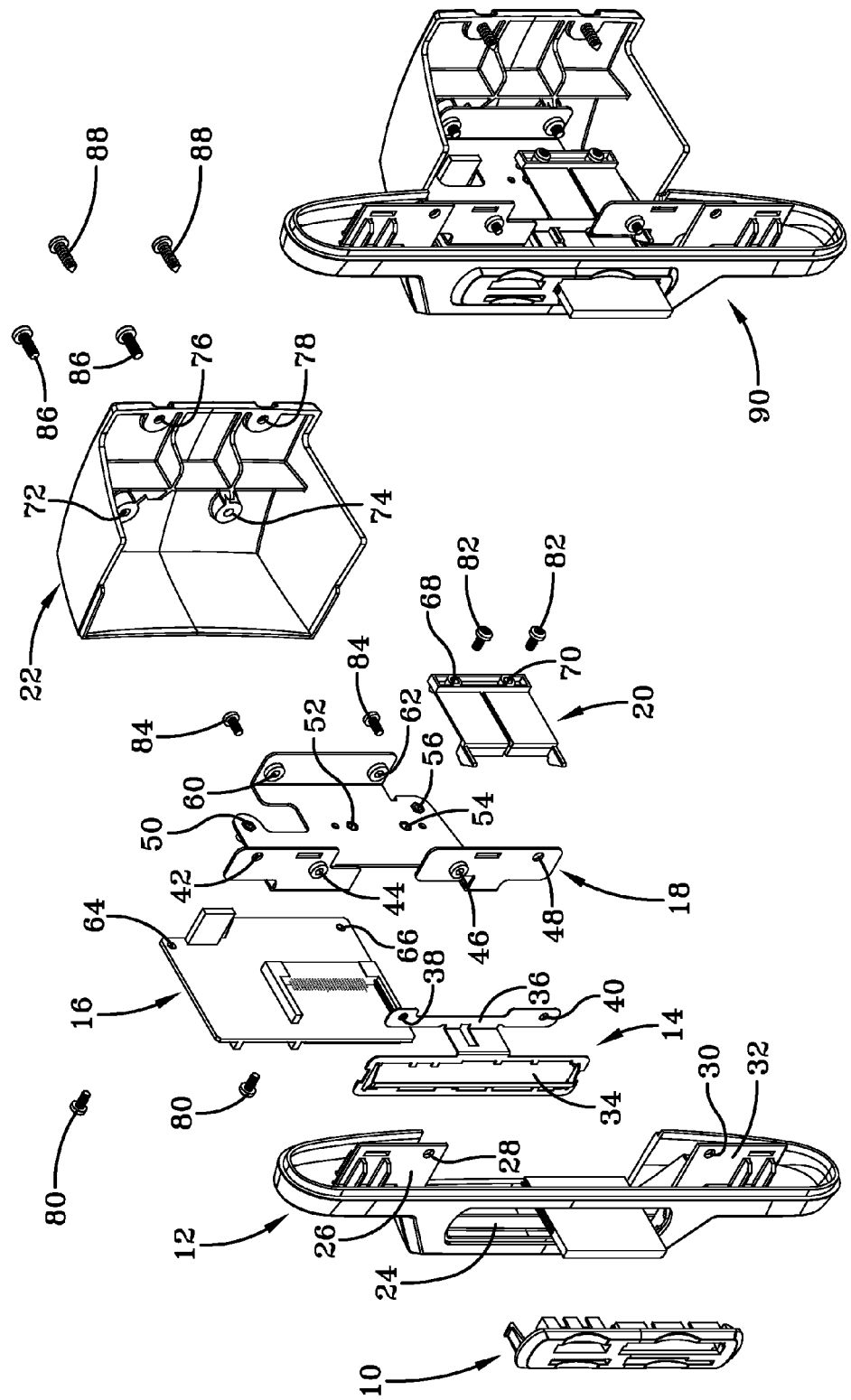
FIG. 1 is an assembly view of a peripheral housing unit of an example embodiment of the present invention.

Referring to FIG. 1, an assembly view of a peripheral housing unit for an example embodiment of the present invention is shown. The peripheral device shown for purposes of illustration in the example embodiment of FIG. 1 is a digital media card reader 16, such as a ZiO™ Corporation 4 slot Dazzle® digital media reader. Alternatively, other types of peripherals, such as telephone handsets, bar code scanners, or magnetic card readers, may be assembled into the peripheral housing unit of the present invention. Various types of USB peripherals as well as custom peripherals that use a serial port or a custom interface could also be integrated into the peripheral housing unit of the present invention.

This particular peripheral housing unit 90 for a media card reader comprises the following components: an insert faceplate 10 for accepting a media card from a user; an end cap 12 which accommodates the insert faceplate 10; a static discharge plate 14; an assembly bracket 18; a pin protector 20; and a shroud 22. The media card reader 16 to be installed within the housing unit 90 is also shown, although it should be understood that the housing unit may also be "blank" or contain a different type of peripheral.

The components of this particular peripheral housing unit are assembled as described below, although not necessarily in the order recited. The static discharge plate assembly 14 is attached to the assembly bracket 18. Fasteners 84 (e.g., pan fasteners) are used to connect the assembly bracket 18 to the static discharge plate assembly 14 via fastener openings 44, 46 on the assembly bracket 18 and fastener openings 38, 40 on the static discharge plate assembly 14. The insert faceplate 10 is snapped into an opening 24 in the end cap 12. The static discharge plate assembly 14 comprises an opening 34 so that a media card inserted by a user via the insert faceplate 10 can communicate with the digital media reader 16. The end cap 12 is attached to the front bezel 132 of a computer using tabs 26, 32 on the end cap 12 that comprise fastener openings 28, 30. The assembly bracket 18 is then assembled to the end cap/bezel assembly. The end cap fastener openings 28, 30 align with assembly bracket fastener openings 42, 48. The pin protector 20 attaches to the assembly bracket 18 using fasteners (e.g., pan fasteners) in pin protector fastener openings 68, 70 and assembly bracket fastener openings 52, 54. For purposes of illustration, in this particular embodiment the digital media reader 16 is attached to the assembly bracket 18 using fasteners (e.g., pan fasteners) in digital media reader fastener openings 64, 66 and assembly bracket fastener openings 50, 56. In other embodiments, the assembly bracket 18 may be adapted to receive different peripherals, which may attach thereto in a slightly different manner. Once the various internal components of the housing unit are assembled and the peripheral(s) is installed, the shroud 22 is attached to the assembly bracket 18 using fasteners (e.g., plastite fasteners) 86 in shroud fastener openings 72, 74 and assembly bracket fastener openings 60, 62. Additional shroud fastener openings 76, 78 are subsequently used to help attach the completed peripheral housing unit 90 (e.g., using threaded fasteners 88) to the rear bezel 134 of the computer.

Referring to FIGS. 2A-2E, various views of an insert faceplate portion of the assembly shown in FIG. 1 can be seen. In an example embodiment of the present invention in which a 4 slot media card reader is installed in the peripheral housing unit, the insert faceplate may comprise different openings 90, 92 to accommodate different types of media cards as shown in the view of FIG. 2A. Tabs on the insert faceplate 94, 96 facilitate the installation of the faceplate into an end cap as shown in FIG. 2C. Once inserted into an end cap, the portion of the insert faceplate that is exposed is minimal as shown in FIG. 2B.

Various views of an end cap portion of the assembly shown in FIG. 1 can be observed by reference to FIGS. 3A-3E. As shown in FIGS. 3A and 3C, the end cap comprises tabs 26, 32 with openings 28, 30 for attaching the end cap to a front bezel 132 of an integrated display computer. The tabs are used to center the components, guide the assembly process, and affix the housing unit to the computer. The end cap further comprises a lip 100, 102 that facilitates the alignment of the end cap to the front bezel 132. An opening 24 in the end cap facilitates user access to the peripheral contained in the housing unit. The opening size and shape may vary depending upon the peripheral device housed in the unit.

The computer is designed to accept the end cap so that the end cap appears to form a finished side of the computer. End caps may extend from the top of the integrated display computer to the bottom or any portion of the length from the top to bottom. The length of the end caps may vary based upon the type of peripheral to be contained in the housing unit.

Figure 4G:
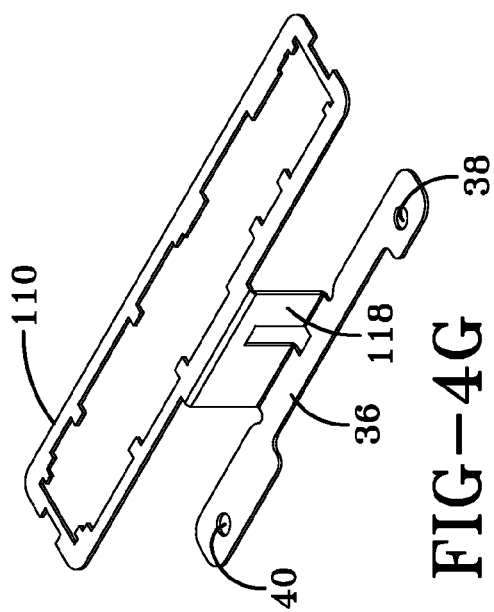
FIG. 4G is a perspective view.
Figure 4F:
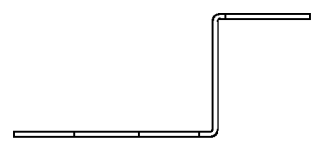
FIG. 4F is a top view.
Figure 4D:
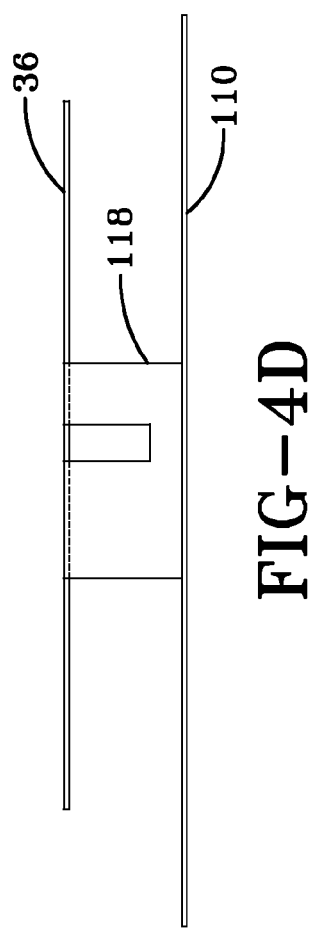
FIG. 4D is a side view.
Figure 4E:
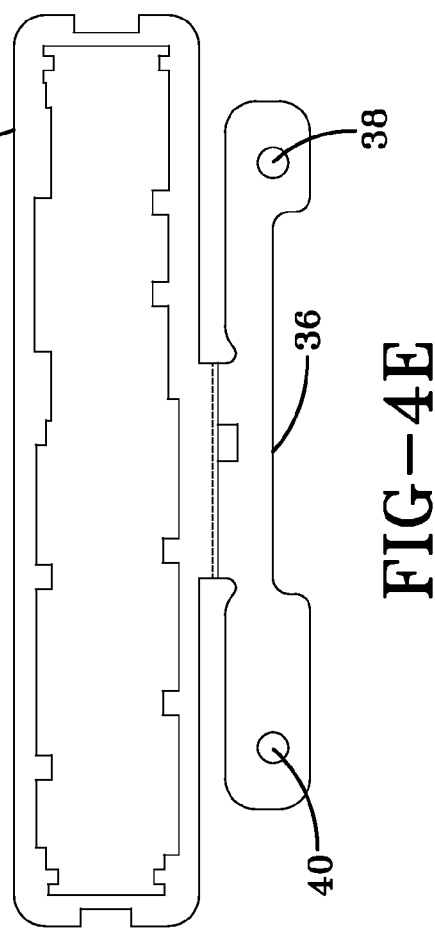
FIG. 4E is a front view.
Figure 4H:
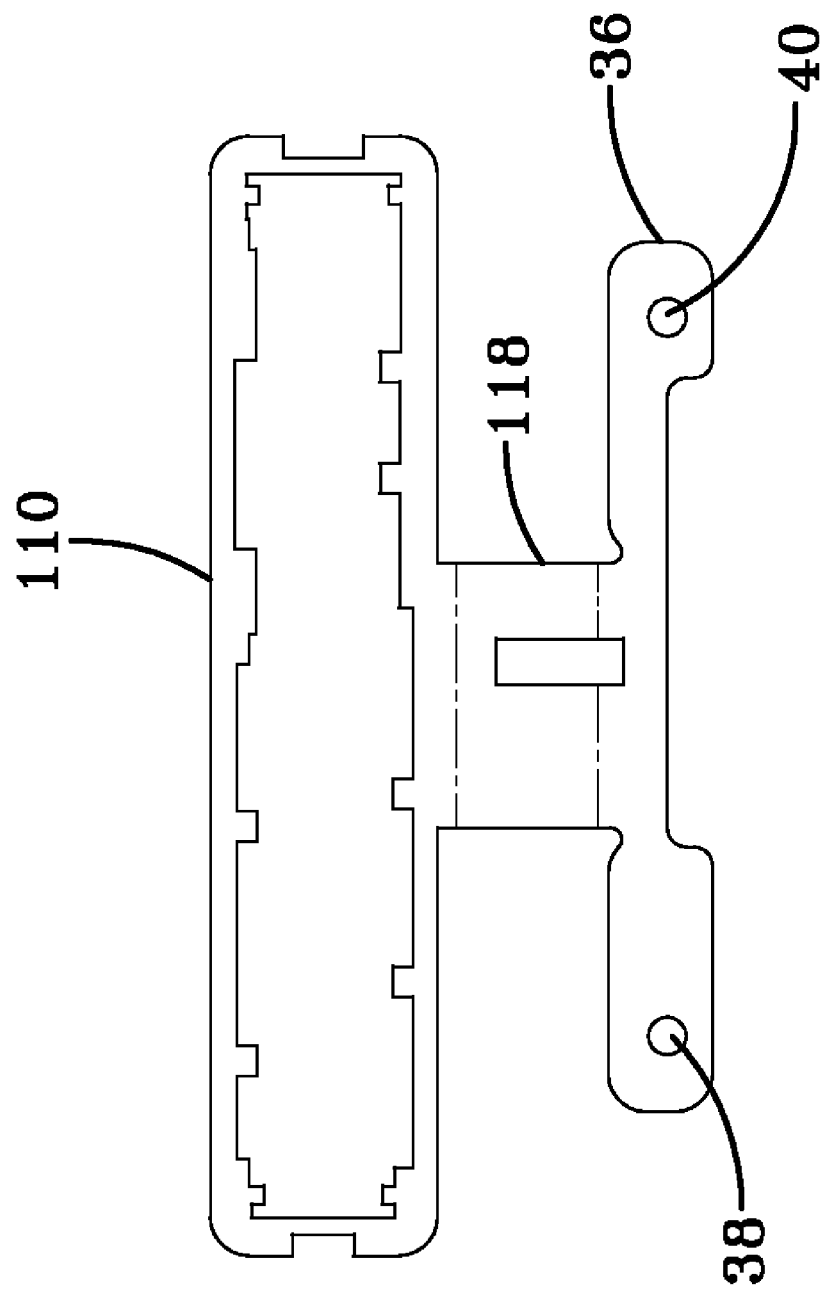
FIG. 4H is a plan view prior to the forming of a static discharge plate portion of the static discharge plate assembly shown in FIG. 1.

Referring to FIGS. 4A-4C, various views of a static discharge plate assembly 14 portion of the peripheral housing unit assembly shown in FIG. 1 can be seen. A plate portion 110 of the static discharge plate assembly can be observed in FIGS. 4D-4F. As shown in FIG. 4A, the static discharge plate assembly 14 comprises a plate 110 with an opening 34 to accommodate insertion of a card, disk, etc. into the peripheral device. It further comprises a mounting bracket 36 with fastener openings 38, 40 so that it may be attached to an assembly bracket within the housing unit. It also comprises a center spine 112 (see FIGS. 5A-5C) that may be attached to the plate 110 at various points 114, 116 and by various means. As shown in FIG. 4B, the mounting bracket 36 and the plate 110 may be connected via a tab member 118.

Figure 5E:
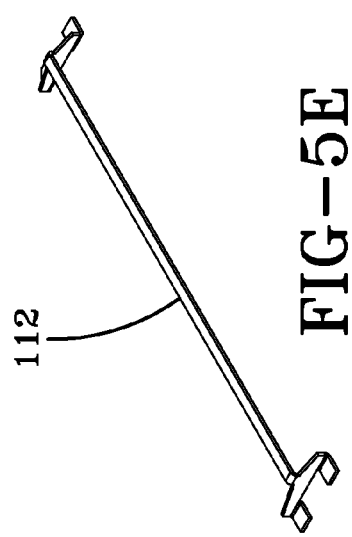
FIG. 5E is a perspective view.
Figure 5F:
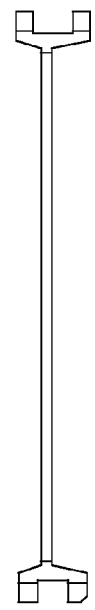
FIG. 5F is a plan view prior to the forming of a center spine portion of the static discharge plate assembly shown in FIGS. 4A-4C.
Figure 5D:
FIG. 5A is a cross-sectional view along A-A.
FIG. 5B is a cross-sectional view along B-B.
FIG. 5C is a front view, 5D is a side view.
Figure 5C:
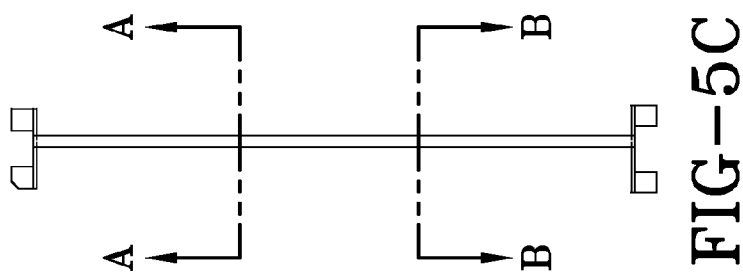
Figure 5A:
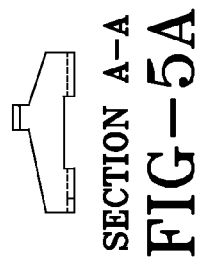
Figure 5B:
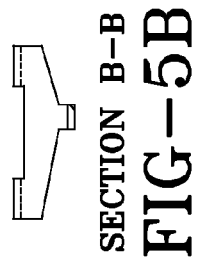

Referring to FIGS. 5A-5C, various views of the center spine 112 portion of the static discharge plate assembly 14 shown in FIGS. 4A-4C can be seen. The center spine may be attached to the plate 110 by various methods such as, for example, spot welding. The center spine 112 helps to maintain separation of the various media receptacles present in the media reader 16 used in this particular embodiment of the present invention.

Figure 6D:
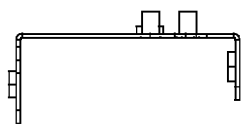
FIG. 6D is a side view.
Figure 6A:
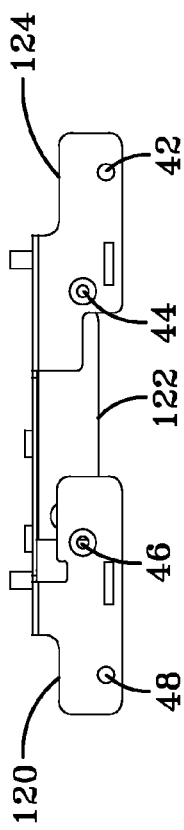
FIG. 6A is a front view.

Various views of an assembly bracket 18 portion of the assembly of FIG. 1 are shown in FIGS. 6A-6D. The assembly bracket comprises a support base 126 and perpendicular tab or flange members 120, 122, 124 on two sides of the support base. The support base 126 and the tab members 120, 122, 124 have fastener openings to accommodate fasteners for attaching other components of the peripheral housing unit to the assembly bracket. FIG. 6A is a front view of the assembly bracket 18 that shows two tab members 120, 124 that are situated at a forward end of the support base. A third tab member 122 is situated at an opposite end of the support base. Fastener openings 48, 42 on the respective outer ends of the tab members 120, 124 align with fastener openings on the end cap. Fastener openings 46, 44 on the respective inner ends of the tab members 120, 124 align with fastener openings on the static discharge plate.

Figure 6B:
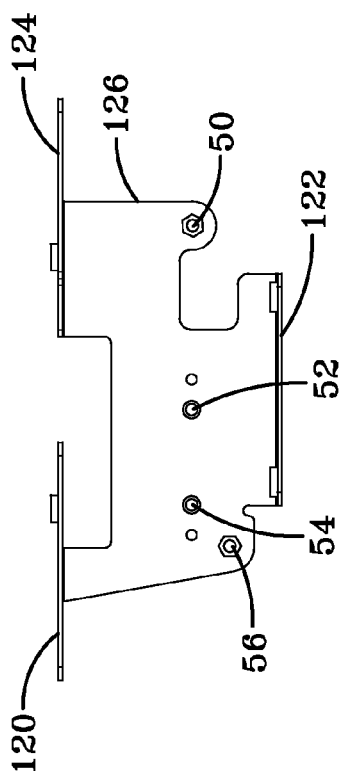
FIG. 6B is a side view.
Figure 6C:
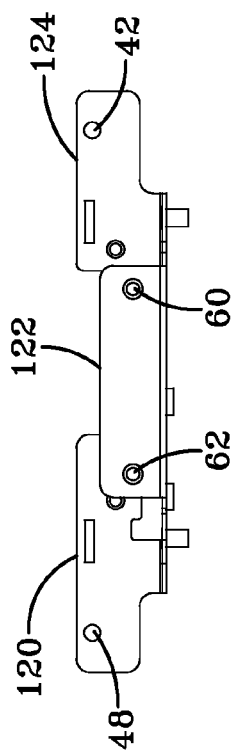
FIG. 6C is a rear view.

FIG. 6B is a side view of the assembly bracket 18. The support base 126 comprises fastener openings 56, 50 that align with fastener openings on the digital media reader. Fastener openings 54, 52 on the support base 126 align with fastener openings on the pin protector. FIG. 6C is a rear view of the assembly bracket that shows the third tab member 122 situated at rearward end of the support base. Fastener openings 62, 60 on the third tab member 122 align with fastener openings on the shroud. FIG. 6D illustrates clearly the position of all of the fastener openings on the support base 122 and tab members 120, 122, 124 of the assembly bracket.

Referring to FIGS. 7A-7E, various views of a pin protector 20 portion of the assembly of FIG. 1 are shown. As shown most clearly in FIGS. 7A and 7C, the pin protector 20 includes fastener openings that allow for its attachment to the assembly bracket 18.

Figure 8A:
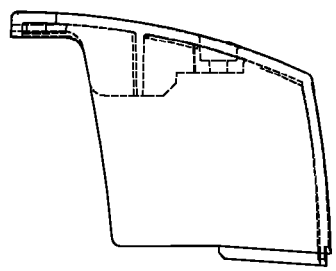
FIG. 8A is a bottom.
Figure 8D:
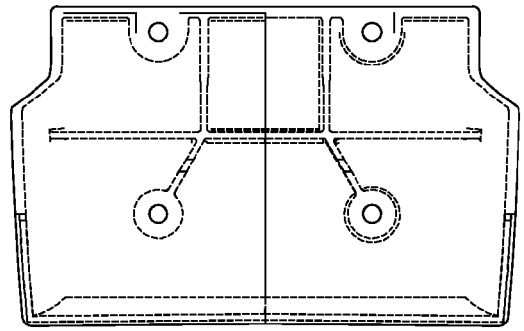
FIG. 8D is a rear view of a shroud shown in FIG. 1.
Figure 8C:
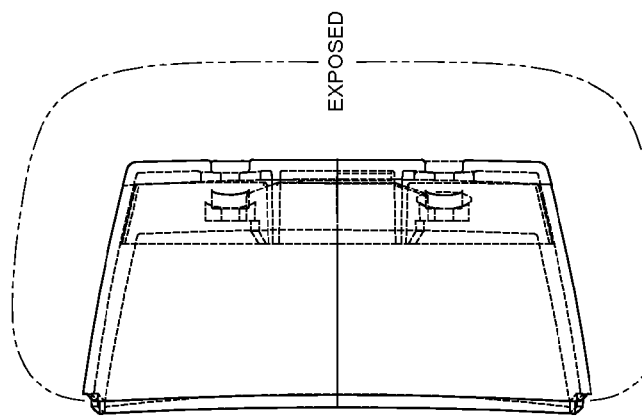
FIG. 8C is a side.
Figure 8B:
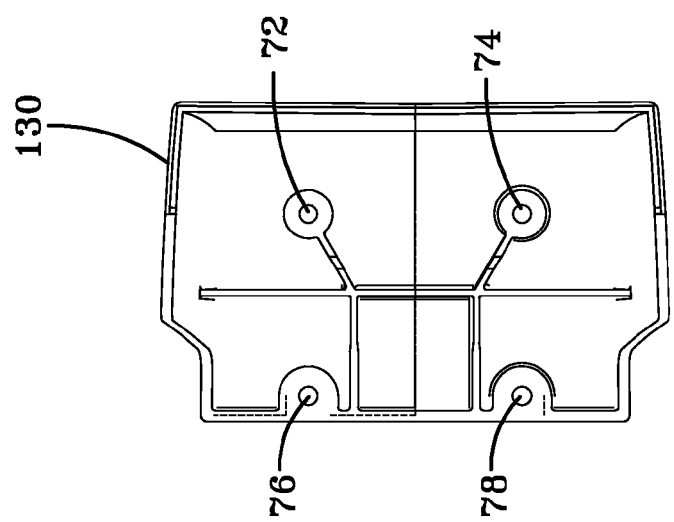
FIG. 8B is a front view.

Referring to FIGS. 8A-8D, various views of a shroud 22 portion of the assembly of FIG. 1 are shown. Referring to FIG. 8B, the shroud can be seen to include fastener openings 72, 74 for attaching the shroud 20 to the assembly bracket 18. The shroud 20 houses the assembly bracket 18 and peripheral device (in this case, media card reader 16) to provide protection to the peripheral device. The design of the shroud 20 also facilitates its connection to the computer, such as via fastener openings 76, 78 and fasteners 88 that cooperate to affix the shroud 20 to the rear bezel 134 of the integrated display computer 140. Consequently, when the components of the housing unit 90 are assembled as shown in FIG. 1, the design of the shroud 20 assists in retaining the completed housing unit on the integrated display computer 140. As best indicated in FIGS. 8C and 9B, a portion of the shroud 20 remains exposed after it is attached to the computer.

Referring now to FIGS. 9A-9C, various views of an integrated display computer with peripherals according to an example embodiment of the present invention are shown. As FIGS. 9A-9C indicate, once attached to the integrated display computer 140, the peripheral housing unit 90 appears to be an integral part of the computer. FIG. 9b is a rear perspective view of the integrated display computer 140 with an attached peripheral housing unit 90. Fastener openings 72, 74 have been used to attach the shroud 20 to the assembly bracket 18 and fastener openings 76, 78 are used to attach the completed peripheral housing unit 90 to the computer.

The enclosed peripheral provides extra functionality for the integrated display computer. As should be apparent from FIGS. 9A-9C, peripheral housing units may be attached to either or both sides of the integrated display unit. Although the present invention has been explained in accordance with an example embodiment of the present invention wherein a digital media reader is enclosed in a peripheral housing unit, other types of peripherals such as magnetic card readers and bar code scanners may be enclosed similarly. The universal attachment design of the present invention allows other types of peripherals to be incorporated easily into the peripheral housing unit thereby increasing the available functionality. Furthermore, the peripheral housing unit may comprise a "blank" so that the integrated display computer can be finished with similar units that do not comprise peripheral functionality.

Figure 10B:
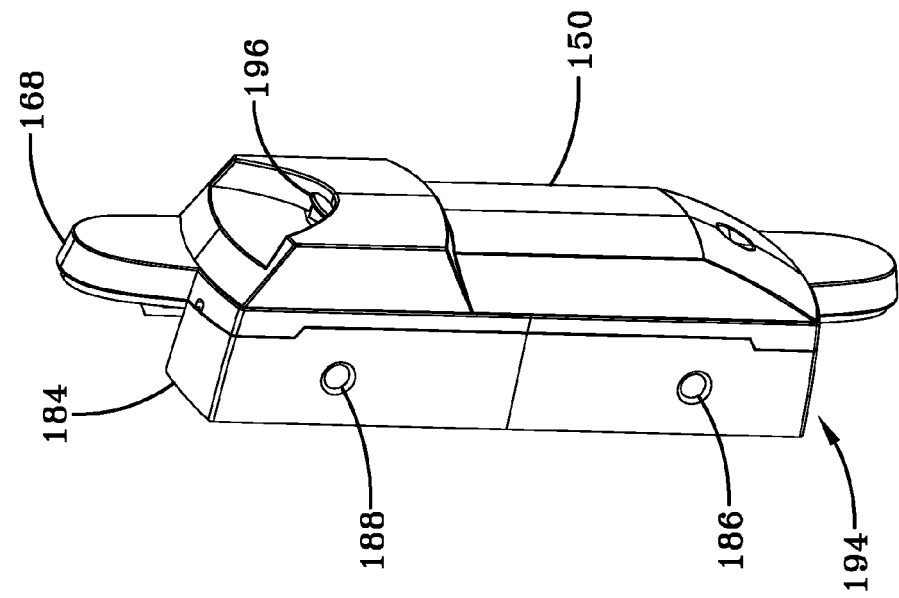
FIG. 10A is an assembly view of a telephone switch cradle peripheral for a handset for an example embodiment of the present invention and FIG. 10B is a rear view of an assembled telephone switch cradle peripheral.
Figure 10A:
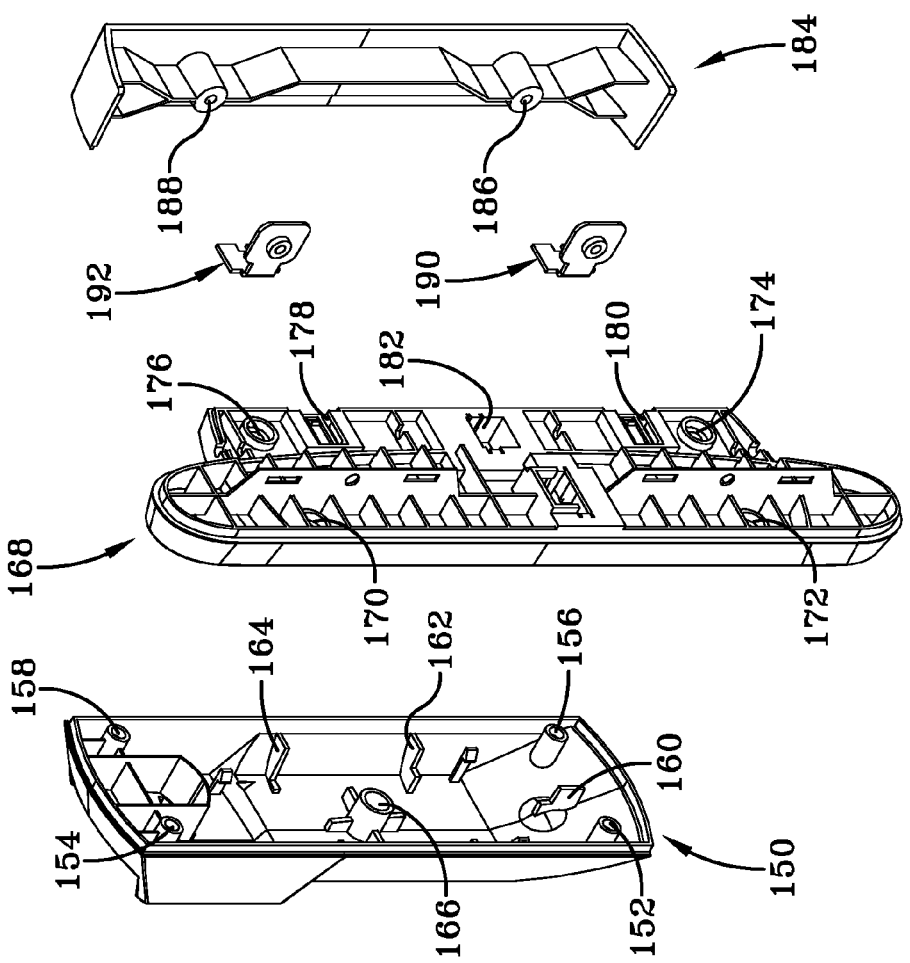

Referring now to FIG. 10A, an assembly view of a telephone switch cradle for holding a handset for an example embodiment of the present invention is shown. This particular telephone switch cradle peripheral comprises the following components: a holster 150 for holding telephone switch cradle componentry and accepting a telephone handset; an end cap 168 that accepts the holster 150; and a shroud 184 that accepts the end cap and holster 168.

The components of this particular peripheral housing unit are assembled as described below, although not necessarily in the order recited. The end cap 168 is attached to the holster 150. Fasteners are used to connect the end cap 168 to the holster 150 via fastener openings 170, 172, 174, 176 on the end cap and standoff fastener openings 152, 154, 156, 158 on the holster 150 that receive the fasteners. The holster 150 is designed to house telephone switch cradle componentry or circuitry. In an example embodiment of the present invention, the telephone switch cradle componentry or circuitry cooperates with software that is operational on the computer to provide voice over IP functionality. The telephone switch cradle componentry may be held in place with support ribs 160, 162, 164 and a standoff 166 that accepts a fastener. The end cap 168 further comprises an opening 182 for connecting the telephone switch cradle componentry to the computer.

Finally, the end cap 168 assembly has openings 178, 180 designed to receive shroud brackets 190, 192 which are used to connect the end cap 168 assembly and shroud 184 to the computer through shroud fastener openings 186, 188. The complete assembly is attached to the rear bezel of a computer using the shroud fastener openings 186, 188 and shroud brackets 190, 192.

Referring to FIG. 10B, a rear view of an assembled telephone switch cradle peripheral for holding a handset is shown. The assembled telephone switch cradle peripheral 194 comprises the shroud 184, end cap 168, and holster 150. Fastener openings 186, 188 on the shroud 184 are used to attach the assembled telephone switch cradle peripheral to the rear bezel of a computer. The holster 150 further comprises a hook 196 for holding a telephone handset.

Figure 11D:
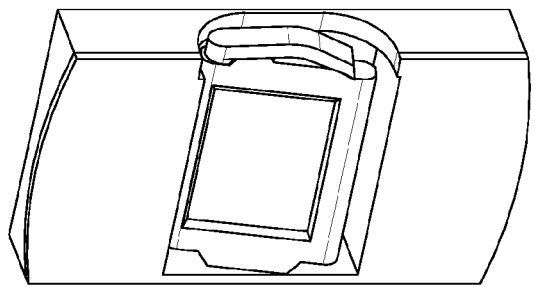
FIG. 11A is a front view of a kiosk having an integrated display computer with a telephone switch cradle peripheral and a telephone handset for a first example embodiment of the present invention and FIGS. 11B-11D are perspective views of the kiosk of FIG. 11A.
Figure 11C:
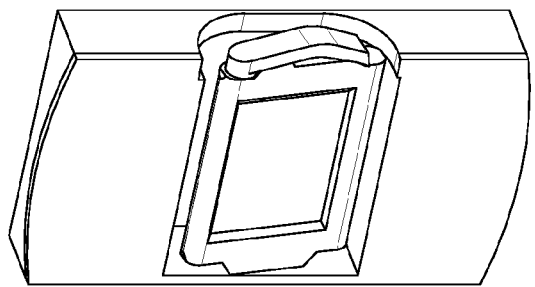
Figure 11B:
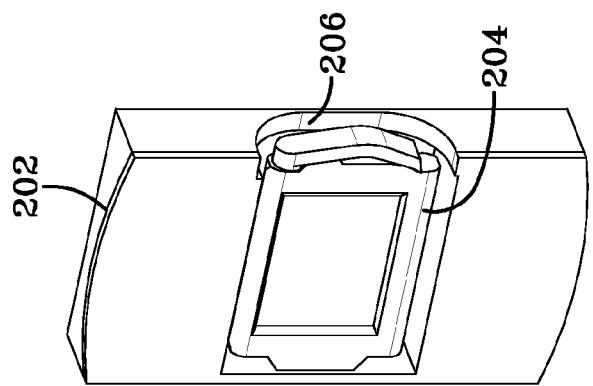
Figure 11A:
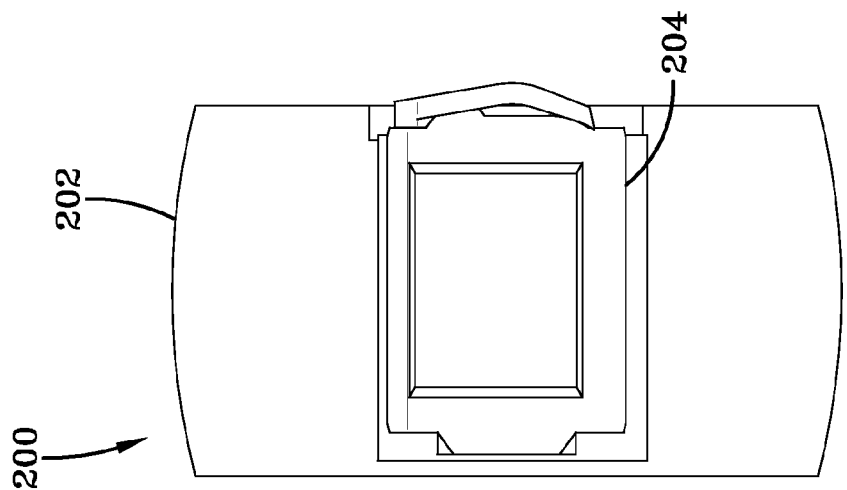

Referring now to FIG. 11A, a front view of a kiosk having an integrated display computer with a telephone switch cradle peripheral and a telephone handset for a first example embodiment of the present invention is shown. FIGS. 11B-11D are perspective views of the kiosk of FIG. 11A. The kiosk 200 comprises a housing 202 that is adapted to hold the integrated display computer with the telephone switch cradle peripheral and telephone handset. The housing 202 is large enough to accommodate any power cords or cables that are needed to operate the integrated display computer 204. Referring to FIG. 11B, in this embodiment of the kiosk, a cutout 206 in the housing 202 allows the integrated display computer 204 to be recessed within the housing 202. The cutout 206 is just large enough to accommodate the integrated display computer 204 so that the computer appears to be an integral part of the housing 202. The cutout 206 curves at the top and bottom portions to accommodate a tilt feature of the integrated display computer 204. The computer 204 may be tilted at various angles as shown in FIGS. 11B-11D. The kiosk may be mounted on a wall that has an electrical outlet, a network connection, and other outlets as may be required to accommodate the power cords and cables that are needed to operate the integrated display computer and support remote communications. Preferably, the outlets are located at a height that allows them to be hidden when the kiosk is mounted on the wall. In addition, the kiosk is preferably mounted at a height that is within the ADA guidelines. The combination of the tilt feature and mounting at an appropriate height results in an ADA-compliant unit.

Figure 12D:
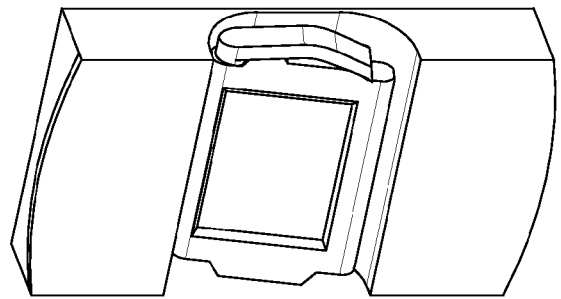
FIG. 12A is a front view of a kiosk having an integrated display computer with a telephone switch cradle peripheral and a telephone handset for a second example embodiment of the present invention and FIGS. 12B-12D are perspective views of the kiosk of FIG. 12A.
Figure 12C:
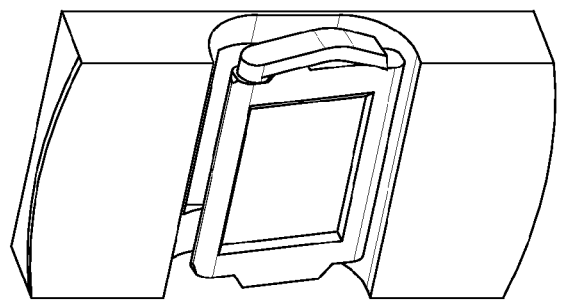
Figure 12B:
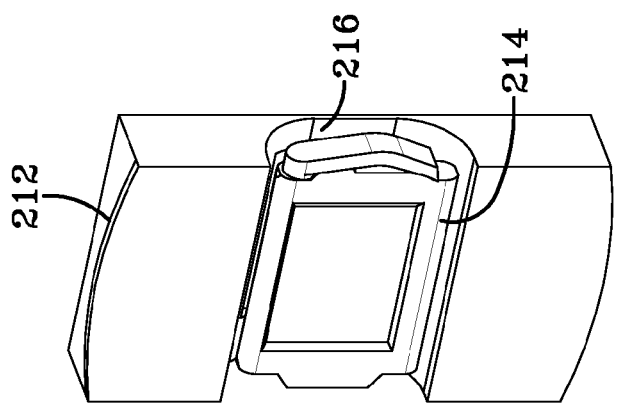
Figure 12A:
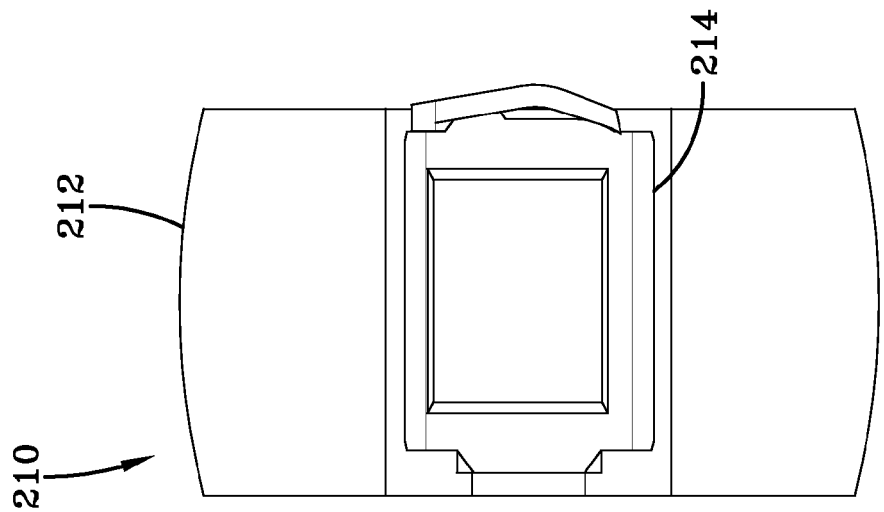

Referring now to FIG. 12A, a front view of a kiosk having an integrated display computer with a telephone switch cradle peripheral and a telephone handset for a second example embodiment of the present invention is shown. FIGS. 12B-12D are perspective views of the kiosk of FIG. 12A. The kiosk 210 comprises a housing 212 that is adapted to hold the integrated display computer with the telephone switch cradle peripheral and telephone handset 214. The housing 212 is large enough to accommodate any power cords or cables that are needed to operate the integrated display computer 213. Referring to FIG. 11B, in this embodiment of the kiosk, a continuous scoop 216 in the housing 210 allows the integrated display computer 214 to be recessed within the housing 212. The continuous scoop 216 is just large enough to accommodate the integrated display computer 214 so that the computer appears to be an integral part of the housing 212. The continuous scoop 216 curves at the top and bottom portions to accommodate a tilt feature of the integrated display computer 214. The computer 214 may be tilted at various angles as shown in FIGS. 12B-12D. The kiosk may be mounted on a wall that has an electrical outlet, a network connection, and other outlets as may be required to accommodate the power cords and cables that are needed to operate the integrated display computer and support remote communications. Preferably, the outlets are located at a height that allows them to be hidden when the kiosk is mounted on the wall. In addition, the kiosk is preferably mounted at a height that is within the ADA guidelines. The combination of the tilt feature and mounting at an appropriate height results in an ADA-compliant unit.

An integrated display computer with a telephone switch cradle peripheral and telephone set is useful in any application where a user would like to obtain more information about a product or service. The computer touch screen and telephone set provide two ways for the user to interact with the computer. The telephone set further provides the user with a way to interact with another person such as a company representative. In an example embodiment of the present invention, the computer is equipped with a single network connection that supports data and voice communications so that information from remote sources as well as information stored locally may be presented to a user interacting with the computer. In this way, VOIP functionality is provided. The network connection may be used to connect to any third party system that provides VOIP call routing. The third party equipment may route calls through the public switched telephone network or it may provide for direct computer-to-computer communications.

Software operational on the computer distinguishes between voice (those originating from or destined for the handset) and data (those originating from or destined for the handset) communications so that requests for information are processed appropriately. Data for information requests may be stored locally or remotely. Some requests may be processed locally using locally stored data while other requests may be routed (using the network connection) for processing remotely. Information responsive to the request may located from a local or remote source and then routed back to the computer and presented to the user via either the touch screen for visual information or the telephone handset for audio information. Audio information may also be presented via speakers that are incorporated into the integrated display computer.

Figure 13A:
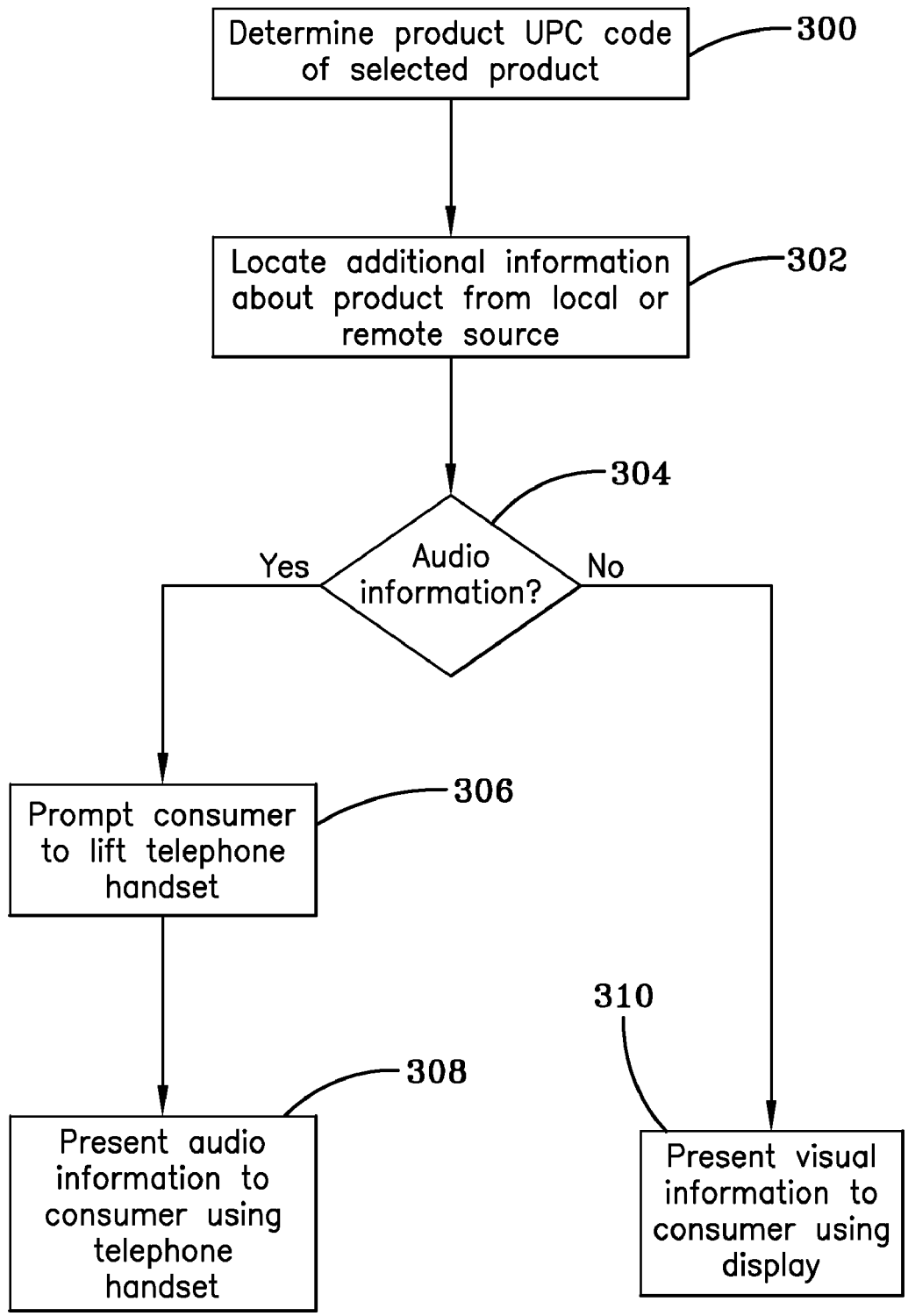
FIGS. 13A and 13B are flowcharts of steps for operating an integrated display computer with a telephone switch cradle peripheral and a telephone handset for example embodiments of the present invention.

Referring to FIG. 13A, in a retail setting, an integrated display computer with a telephone switch cradle peripheral and telephone handset and a bar code scanner peripheral may operate as follows. A consumer who would like more information about a particular product may scan the product's UPC code using the bar code scanner. Alternatively, the consumer may be prompted to select a product using the touch screen. Once the product code is determined by software operational on the computer 300, it may respond to the request by obtaining information stored locally and/or remotely and presenting it to the consumer 302. The type of additional information related to the product is determined 304. If the additional information is audio information, the consumer may be prompted to lift the telephone handset so the information can be presented 306. The additional information may be presented via the handset (e.g., using a recording that is stored locally or obtained from a remote site) if it is audio information 308 or on the touch screen if it is visual/textual information 310.

Figure 13B:
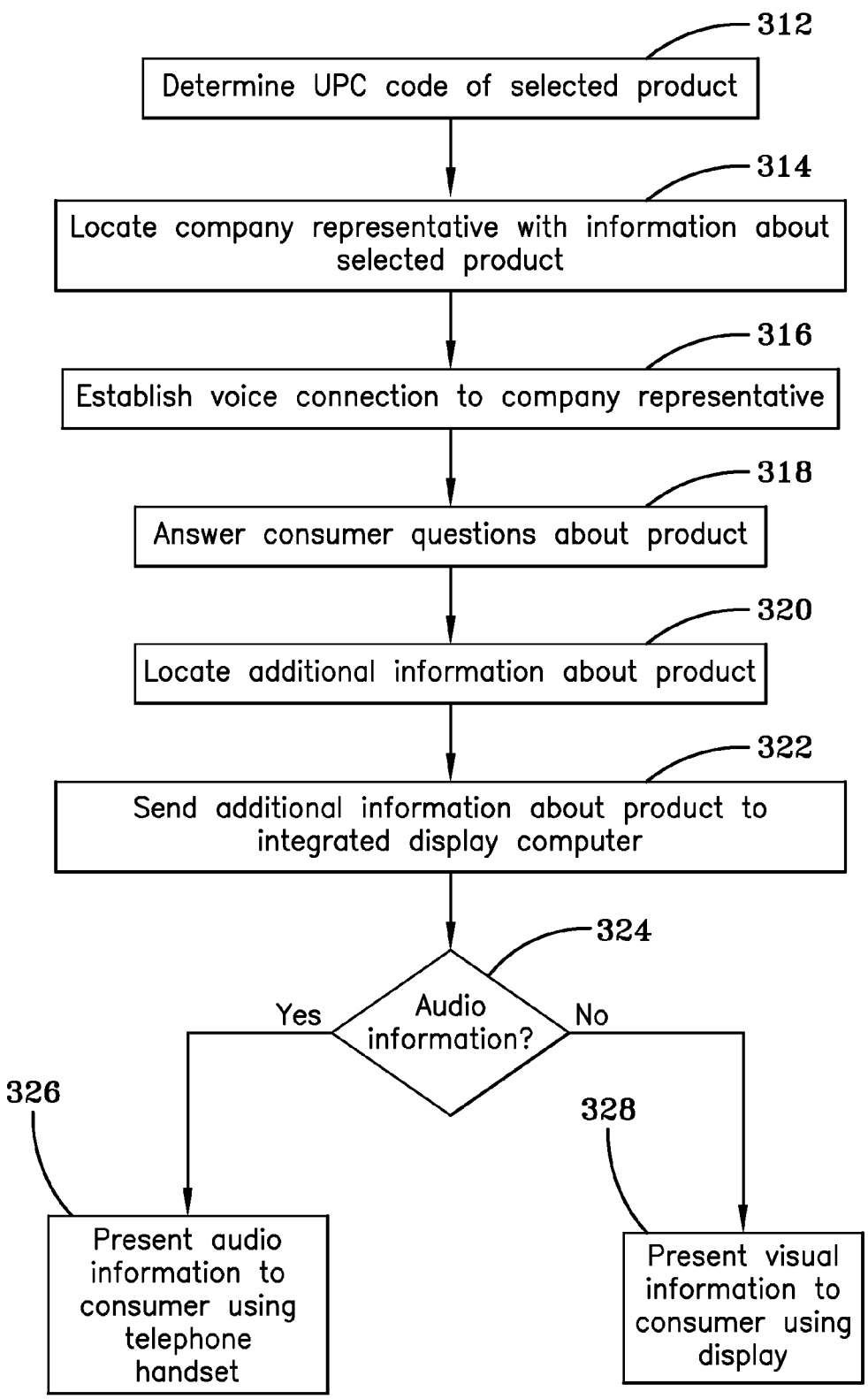

Referring to FIG. 13B, an integrated display computer with a telephone switch cradle peripheral and telephone handset and a bar code scanner peripheral may also operate in a retail setting as follows. A consumer who would like more information about a particular product may scan the product's UPC code using the bar code scanner or select the product by responding to prompts on the touch screen. The UPC code of the selected product is determined 312. A request for additional information about the product may be routed to a company product representative with whom the consumer may interact by picking up the handset 314. Using the product code, a voice connection may be established to a call center for the product manufacturer and the call may be directed to an appropriate representative for the product 316. Because the product of interest is known to the computer, the consumer is not required to dial the telephone or select a specific party. The consumer simply lifts the handset and connects to a company representative because the computer has determined the context for the conversation. The company representative may answer any questions the consumer has about the product 318. The company representative also may ask the consumer about the specific type of information he or she would like to receive and then arrange to direct additional information to the consumer. Additional information about the product is located 320 and arrangements are made to send the additional information about product to integrated display computer 322. The additional information may be audio or visual/textual 324. Additional audio information about the product may be presented to the consumer using telephone handset 326 while additional visual/textual information about the product may be presented to the consumer using display.

The present invention provides a consumer with multiple interfaces for interacting with the computer and obtaining additional information about products. The consumer may be provided with different methods for selecting a product of interest. Once a product of interest is selected, additional information may be obtained from local or remote sources. For information obtained from remote sources, the same network connection may be used to transfer the information to the computer whether it is voice/audio or visual/textual data. Software operational at the computer distinguishes between voice/audio and visual/textual data so that information is presented appropriately whether on the display or using the telephone handset.

The ability to attach various types of housing units, functional or non-functional, allows the integrated display computer to be configured for many applications. Such applications include use in retail stores, advertising and informational promotions, schools, libraries, and hospitals. The computers are also suitable for use in many different settings including high-traffic settings. The peripherals are well-protected and securely attached to the computer. Therefore, they are unlikely to be disturbed or detached during normal operation. Finally, the housing units may be adapted for integrated display computers of many sizes. Any limitations on size may be dictated by the size of actual peripheral device rather than the other components comprising the peripheral housing unit.

Integrated display computers with peripherals according to the present invention provide substantial functionality in an attractive package. While example embodiments of the invention have been illustrated and described, various modifications and combinations can be made without departing from the spirit and scope of the invention. Many types of peripheral devices may be designed and manufactured for attachment to an integrated display computer according to the apparatus and method of the present invention and still fall within the scope of the present invention. Peripheral housing units according to the present invention may be attached to the top and bottom of a computer in addition to the sides of a computer. Finally, peripheral housing units according to the present invention may be attached to conventional display monitors in addition to integrated display computers. Modifications, combinations, and equivalents to the system and method of the present invention are intended to be covered and claimed.

What is claimed is:

1. A housing unit for attaching a telephone switch cradle peripheral to a computer having a common side profile and a rear bezel with a common rear bezel attachment means for use with a plurality of different peripheral devices, said housing unit comprising:
   an end cap corresponding with said common side profile of said computer to form a flush and continuous side of said integrated display computer, and having an end cap fastening means;
   a holster for holding telephone switch cradle componentry, said holster being attached to said end cap using said end cap fastening means; and
   a shroud attached to said end cap and having a common shroud fastening means for attaching said shroud to said rear bezel of said computer using said common rear bezel attachment means,
   wherein said end cap and said shroud cooperate to facilitate attachment of said holster for holding telephone switch cradle componentry to said computer.

2. The housing unit of claim 1 wherein said housing unit is attached to a side of said computer.

3. The housing unit of claim 1 wherein said shroud is attached to said end cap using a shroud bracket that is inserted into an opening in said end cap.

4. The housing unit of claim 1 wherein said computer is an integrated display computer.

5. The housing unit of claim 1 wherein said computer is a fanless integrated display computer.

6. A method for attaching a peripheral housing unit containing a telephone switch cradle to a computer, said method comprising:
   providing a computer having a common side profile, and a rear bezel with a common rear bezel attachment means corresponding with a plurality of different peripheral devices;
   attaching an end cap to a holster for holding telephone switch cradle componentry, said end cap corresponding with said common side profile of said computer to form a flush and continuous side of said integrated display computer once assembled;
   attaching a shroud to said end cap; and
   attaching said shroud to said rear bezel of said computer using common rear bezel attachment means.

7. The method of claim 6 wherein said end cap is attached to said shroud using a shroud bracket that is inserted into an opening in said end cap.

8. The method of claim 6 wherein said computer is an integrated display computer.

9. The method of claim 6 wherein said computer is a fanless integrated display computer.

10. An integrated display computer with a peripheral housing unit containing a telephone switch cradle comprising:
   an integrated display computer having a common side profile and a front and rear bezel, said rear bezel having a common rear bezel attachment means corresponding with a plurality of different peripheral devices;
   an end cap adjacent to a front bezel and corresponding with said common side profile of said integrated display computer, wherein said end cap forms a flush and continuous side of said integrated display computer;
   a holster for holding telephone switch cradle componentry, said holster attached to said end cap; and a shroud attached to said end cap and said rear bezel of said computer, said shroud attached to said rear bezel of said computer using common shroud fastening means and common rear bezel attachment means;

wherein said holster, said shroud, and said end cap form an enclosed housing unit for containing said telephone switch cradle componentry.

11. The integrated display computer of claim 10 wherein said shroud is attached to said end cap using a shroud bracket that is inserted into an opening in said end cap.

12. The integrated display computer of claim 10 wherein said integrated display computer is a fanless computer.

13. The integrated display computer of claim 10 wherein a housing unit is also located on an opposite side of said integrated display computer, said housing unit optionally including a second peripheral device.

14. The integrated display computer of claim 10 further comprising:

a code reader for scanning a code associated with a product;

a telephone handset in said holster; and a network connection.

15. The integrated display computer of claim 14 further comprising:

a voice over IP connection with company representatives for said product.

16. The integrated display computer of claim 10 further comprising:

an electronic connection with a remote storage device adapted to transmit data to said integrated display computer.

17. The integrated display computer of claim 16 wherein:

said data is video data for display on said integrated display computer.

18. The integrated display computer of claim 16 wherein:

said data is audio data sent to said telephone switch cradle componentry.

* * * * *

UNITED STATES PATENT AND TRADEMARK OFFICE
CERTIFICATE OF CORRECTION

PATENT NO. : 7,542,283 B1  Page 1 of 1
APPLICATION NO. : 11/421627
DATED : June 2, 2009
INVENTOR(S) : Michael A. Curran and Gary A. Peck It is certified that error appears in the above-identified patent and that said Letters Patent is hereby corrected as shown below:

In Column 1, line 10, please delete "Intecirated" and insert -- Integrated --

In Column 1, line 14, please delete "Intecirated" and insert -- Integrated --

In Column 12, line 48, please delete "using" and insert -- using said --

Signed and Sealed this

Fourteenth Day of July, 2009

JOHN DOLL
*Acting Director of the United States Patent and Trademark Office*